United States Patent [19]
Cassidy et al.

[11] Patent Number: 4,866,014
[45] Date of Patent: Sep. 12, 1989

[54] METHOD OF MAKING A STRESS RESISTANT, PARTIALLY STABILIZED ZIRCONIA CERAMIC

[75] Inventors: Donald J. Cassidy, Plymouth; Roy L. Van Alsten, Redford; Morton E. Milberg, Southfield, all of Mich.

[73] Assignee: Ford Motor Company, Dearborn, Mich.

[21] Appl. No.: 37,654

[22] Filed: Apr. 13, 1987

[51] Int. Cl.$^4$ .............................................. C04B 35/48
[52] U.S. Cl. .................................... 501/103; 501/152; 264/56; 264/66
[58] Field of Search ............... 501/103, 104, 105, 152; 264/56, 66

[56] References Cited

U.S. PATENT DOCUMENTS

| | | | |
|---|---|---|---|
| 4,344,904 | 8/1982 | Yamada et al. | 501/104 |
| 4,360,598 | 11/1982 | Otagiri et al. | |
| 4,370,393 | 1/1983 | Watanabe et al. | |
| 4,520,114 | 5/1985 | David | 501/103 |
| 4,525,464 | 6/1985 | Claussen et al. | 501/105 |
| 4,533,647 | 8/1985 | Tien | 501/128 |
| 4,542,110 | 9/1985 | Nakada et al. | 501/103 |
| 4,544,607 | 10/1985 | Kaneno et al. | 501/103 |
| 4,565,792 | 1/1986 | Knapp | 501/103 |
| 4,587,225 | 5/1986 | Tsukuma et al. | 501/103 |
| 4,619,817 | 10/1986 | Stambaugh et al. | 501/103 |
| 4,666,467 | 5/1987 | Matsumoto et al. | 501/104 |
| 4,703,024 | 10/1987 | Aronov | 501/103 |

OTHER PUBLICATIONS

"Degradation During Aging of Transformation-Toughened $ZrO_2$—$Y_2O_3$ Materials at 250° C.", Lange et al., Journal of the American Ceramic Society, vol. 69, pp. 237-240, (1986).

Primary Examiner—Brian E. Hearn
Assistant Examiner—Andrew Griffis
Attorney, Agent, or Firm—Joseph W. Malleck; Roger L. May

[57] ABSTRACT

A method is disclosed for making an aging-resistant, partially stabilized zirconia ceramic, which method is not totally dependent upon grain size control, can function to eliminate substantially any monoclinic phase that results from machining such zirconia article, and employs a novel heat treatment to do so.

The method particularly comprises: (a) sintering such article at a temperature and for a period of time to produce a densified product having little or no monoclinic crystal phase when cooled to room temperature (i.e. 2550°-2650° F. for 0.5-4 hours); (b) subjecting the cooled sintered article a machining operation that results in the formation of monoclinic crystal phase on the surface of the part; and (c) heating said treated article to the temperature range of 1800°-1950° F. (982°-1066° C.) to re-transform monoclinic crystal structure to tetragonal crystal.

12 Claims, No Drawings

METHOD OF MAKING A STRESS RESISTANT, PARTIALLY STABILIZED ZIRCONIA CERAMIC

BACKGROUND OF THE INVENTION

1. Technical Field

The invention relates to the art of making partially stabilized zirconia with yttria and, more particularly, to the technology of eliminating the inherent aging degradation of such ceramic.

2. Description of the Prior Art

It is well known in the art that transformation toughened, partially stabilized zirconia (PSZ) ceramics, in which the stabilizer is yttria, have a major defect which comprises deterioration with elapse of time in the temperature range of 200°–300° C.; the tetragonal phase zirconia in the surface layer, typical of the toughened material, reverts to the stable monoclinic form and the strength is substantially diminished. The deterioration is exacerbated by water. A number of explanations of this phenomenon have been offered but general agreement has not been achieved.

Although dealing with partially stabilized zirconia solid electrolytes, which are not transformation toughened, U.S. Pat. Nos. 4,360,598 and 4,370,393 do address the deterioration problem stated above. Since the materials are not toughened, the stable phases present at room temperature are monoclinic and cubic. These non-toughened materials are produced by firing at temperatures of at or above 1500° C., at which temperature the stable phases are tetragonal and cubic or purely tetragonal, depending on the yttria content. With prolonged heating, grain growth will occur; on cooling, the tetragonal phase converts to the monoclinic or monoclinic and cubic phases, and the tetragonal to monoclinic transformation is accompanied by a volume expansion of about 4%. According to the aforementioned patents, this expansion on cooling due to crystal transformation leads to mechanical stress at the grain boundaries which, in turn, leads to cracking and deterioration when the material is held at temperatures of 200°–300° C. for extended periods. These patents further state that the problem can be overcome or reduced if the grain size is less than $2\mu$, so that fine grained materials are protected from deterioration.

Transformation-toughened PSZ, containing $Y_2O_3$ as a stabilizer, will contain only tetragonal phase zirconia at room temperature if the $Y_2O_3$ content is less than about 4 mol percent, and a mixture of tetragonal and cubic phases with more than about 4 mol percent $Y_2O_3$. The high temperature tetragonal phase is retained at room temperature by firing a very reactive high surface area coprecipitated $ZrO_2$—$Y_2O_3$ powder, in the temperature range of 1400°–1500° C., so as to obtain a fine-grained ceramic body. Since this material contains no apparent monoclinic phase, it appears at first glance as if the deterioration mechanism, of crystal transformation stress, suggested by U.S. Pat. Nos. 4,360,598 and 4,370,393, cannot be applicable. However, in order to form a useful item from a fired PSZ body, machining of some sort is usually required and this operation causes the transformation of some of the tetragonal zirconia in the machined surfaces to the monoclinic form, so that stress associated with the formation of the monoclinic phase again presents the problem of low temperature aging deterioration.

An article entitled "Degradation During Aging of Transformation-Toughened $ZrO_2$—$Y_2O_3$ Materials at 250° C.", by Lange et al, appearing in the *Journal of the American Ceramic Society*, Vol. 69, pp. 237–240 (1986), deals directly with the use of low temperature aging deterioration in transformation-toughened $ZrO_2$—$Y_2O_3$ materials and suggests that water leaches yttrium out of tetragonal PSZ grains, leading to their transformation to the monoclinic form accompanied by expansion which leads to stress and, if the monoclinic grains are above a critical size, microcracking. In any event, the connection between the deterioration and the presence of the monoclinic crystalline phase is generally invoked. That the deterioration mechanism suggested by Lange et al further requires the involvement of water is not a drawback, since water vapor is always present in ambient atmospheres.

Even if process steps are taken to ensure the inhibition of the transformation of tetragonal crystal to the monoclinic crystal, such as suggested in U.S. Pat. Nos. 4,370,393 and 4,360,598, there remains the stimulation of the monoclinic phase by machining of such sintered material. That is to say, the material may be cooled to room temperature by observing certain sintering conditions so that the tetragonal crystal phase predominates even at room temperature, accompanied only by small seeds of monoclinic crystal.

The important problem that remains is that of eliminating the monoclinic phase from a partially stabilized zirconia material after sintering whether stimulated by machining or by improper sintering techniques.

SUMMARY OF THE INVENTION

This invention provides a method of making an aging-resistant, yttria partially-stabilized zirconia ceramic, which method is not totally dependent upon grain size control, can function to substantially eliminate any monoclinic phase and/or monoclinic seed that results from machining or improper sintering such zirconia article, and employs a combination of a shortened sintering treatment and novel heat treatment to do so.

The method particularly comprises: (a) sintering such article at a temperature and for a time period to produce a densified product having little or no monoclinic crystal phase when cooled to room temperature (i.e., 2550°–2650° F. (1399°–1454° C.) for 0.5–4 hours); (b) machining the subject article to effect the desired dimensional configuration (such machining stimulating the growth of monoclinic crystal on the surface of the article); and (c) heating the machined article to the temperature range of 1800°–1950° F. (982°–1066° C.) for 4–30 hours to re-transform the monoclinic crystal structure to tetragonal crystal with improved stability in the temperature range of 200°–300° C.

DETAILED DESCRIPTION AND BEST MODE

Partially stabilized zirconia, which contain yttria as a stabilizing agent, are those that contain at least one mol percent but less than 7.3 mol percent of $Y_2O_3$. Partially stabilized zirconia inhibits the tendency to convert tetragonal phase zirconia to monoclinic phase zirconia at room temperature and thus is considered transformation toughened. However, stress by machining or cracking can stimulate growth of the monoclinic phase from such seemingly tetragonal phase. The method herein comprises: (a) preparing an article from zirconium oxide and a yttrium compound which is sintered at a temperature in the range of 2550°–2650° F. (1399°–1454° C.) for a shortened period of time to produce a densified product having little or no monoclinic phase when cooled to room temperature; (b) subjecting the cooled sintered article to a machining operation that results in the formation of monoclinic crystal phase on the surface of the part; and (c) heating the machined article to the temperature range of 1800°–1950° F. (982°–1065° C.) for 4–30 hours to transform any of said stimulated monoclinic phase to a tetragonal crystal structure.

CHEMISTRY

To prepare a partially-stabilized zirconia body, a coprecipitated powder mixture of $ZrO_2$ and $Y_2O_3$ is used with at least one mol percent and no less than 7.3 mol percent $Y_2O_3$ and preferably with $Y_2O_3$ present in amounts ranging from 2–5 mol percent. The average particle size of such coprecipitated material is typically 250 angstroms (often referred to as reactive grade) and has a purity of greater than 99.3% $ZrO_2/Y_2O_3$. Major impurities present in such powder material include oxides of silicon, iron, and sodium in the range of 0.2–0.3%. The coprecipitated powder has a very high specific surface area of approximately 18 $m^2/g$.

FABRICATION

The prepared powder mixture is formed into an article, preferably by isostatic pressing, under a pressure of 105°–315 MPa. Alternatively, the powder mixture may be formed as a slurry and slip cast according to conventional slip cast techniques requiring water removal via low temperature drying. For a teaching as to this technique see U.S. Pat. No. 4,067,943, incorporated herein by reference.

SINTERING

The formed article is sintered in air in the temperature range of 2550°–2650° F. (1399°–1454° C.) for a period of less than 10 hours, preferably 0.5–4 hours, to provide a resulting density equal to or greater than 97% of theoretical. Conventional sintering periods normally require 20 or more hours. Upon cooling to room temperature at a rate generally obtained with air cooling, no monoclinic $ZrO_2$ was detected by x-ray diffraction (XRD), despite the fact that during cooling considerable time was spent in the temperature range of 302°–752° F. (150°–400° C.). Small amounts of cubic $ZrO_2$ could have been present but undetected because of the overlap of diffraction peaks. Seeds of monoclinic crystal growth usually still remain, the latter being a phenomenon that will begin a crystal growth under subsequent favorable conditions.

MACHINING

The sintered article is subjected to a machining operation, either prior to or subsequent to the heat treatment defined hereinafter; such machining is of the type that can stimulate the growth of the monoclinic crystal structure, particularly from the seeds present. This occurs with machining of such articles to define a desired shape; machining is used in the broad sense of the movement of a cutting tool against the article in a manner to shear metal therefrom at a rate and feed that increases the local temperature of the article resulting in a stimulated phase transformation. The cutting acts as the equivalent of cracking which stimulates the growth of monoclinic crystal structure by the phenomena outlined in the previous articles. It has been found that certain types of machining promote greater growth of the monoclinic phase than others. For instance, high speed deep roughing promotes growth of the monoclinic phase, while very fine machining or the extreme of fine machining, i.e., polishing, can actually remove some of the thin layer of monoclinic crystal produced by previous machining. The machined article thus may have varying concentrations of monoclinic crystal on the surface zones which have been subjected to such machining stress. If the sintered/machined article were to be utilized in such condition, and subjected to aging in its useful environment (aging is used here to mean the result of being in the temperature range of 200°–300° C. for a period of time in excess of 20 hours), extensive monoclinic crystal growth would occur, resulting in severe loss in mechanical strength. It has also been found that water vapor accelerates the aging phenomenon in transformation toughened $ZrO_2$—$Y_2O_3$ polycrystalline materials.

HEAT TREATMENT

The machined article is then heated in air to the temperature range of 1800°–1950° F. (982°–1066° C.) for 4–30 hours to transform the monoclinic phase to tetragonal phase. Although other stabilization or heat treatment temperatures have not been explored, it is suspected that heat treatment temperatures lower than 1800° F. will produce desired results, but at a penalty of longer heat treatment times. Likewise, higher heat treatment temperatures could also be effective up to the point of an increase in crystal size above a critical size where tetragonal crystals revert spontaneously to monoclinic at room temperature. The resulting sintered machined article is comprised of zirconium oxide and 1–7.3 mol percent yttrium oxide, the article being comprised of a substantially tetragonal crystalline structure with surface zones of retransformed monoclinic tetragonal crystals, and the crystal structure has an average particle size of 0.5–2 microns.

AGING TREATMENT

When a conventionally sintered and machined article was subjected to prolonged exposure at low temperatures, namely, 500° F. (260° C.) in ambient air, the flexural strength of the article was reduced from 121 to 40 kpsi, about 67% (Table I, test 1). This strength was reduced to 10% after aging for 180 days at 500° F. (260° C.). (Aging this same material under high relative humidity conditions would have exacerbated these losses in strength.) Using the sintering and heat treatment of this invention, the material will retain its fracture strength after 60 days; and, even after 60 days in water vapor at such temperatures, will have lost none of its fracture strength (see Table 1, tests 1 and 2).

Although the reason for the physical improvement is not fully understood, it is believed that the shortened sintering treatment and post-heat treatment not only re-transforms the monoclinic to tetragonal phase, but also inhibits the formation of further monoclinic phase by eliminating the presence of monoclinic seed crystals on the surface of the machined article.

EXAMPLES

A series of examples was prepared to corroborate the limits of the processing of this invention. In each example, samples were prepared from a reactive grade $ZrO_2$ powder material containing 3 mol percent $Y_2O_3$. The powder was then isostatically pressed under a pressure of about 315 MPa to form articles for sintering. The purity of the powder used in making the compacts was 99.3% $ZrO_2/Y_2O_3$. Test 1 was run without high humidity aging conditions and test 2 did have high humidity during aging. Some of the samples were subjected to a sintering treatment characteristic of the prior art at high temperatures of about 2650° F. (1454.4° C.) for extended periods of time of about 24 hours. Such material was machined into test bars and subjected to strength measurements before and after aging at 500° F. (260° C.) (Table I, test 1, samples 1 and 2). Other samples were sintered for shorter time periods of 0.5 to 4 hours, machined into test bars, and heat treated at 1900° F. (1037.8° C.) for 24 hours duration (Table I, tests 1 and 2, samples 3–8). Samples were subject to aging tests at 500° F. (260° C.) for a period of 60 days (and in one case 180 days). In addition, the samples were aged, in test 2, in an atmosphere of high relative humidity at 500° F. (260° C.). The high humidity atmosphere consisted of air which had been saturated with water vapor at room temperature.

From Table I, it can be concluded that material sintered and heat treated according to the teachings of this patent is far more resistant to the aging process of prolonged exposure at 500° F. (260° C.) in both ambient air and high relative humidity conditions.

While particular examples of the invention have been illustrated and described, it will be obvious to those skilled in the art that various changes and modifications may be made without departing from the invention, and it is intended to cover in the appended claims all such changes and equivalents as fall within the true spirit and scope of the invention.

TABLE I

| Sample | Sintering Temp. (°F.) | Sintering Time (Hrs.) | Test 1 | | | Test 2 | | |
|---|---|---|---|---|---|---|---|---|
| | | | M.O.R. (KPSI) As Machined | M.O.R. (KPSI) Heat Treated 1900° F. | M.O.R. (KPSI) 500° F. 60 Days | M.O.R. (KPSI) Heat Treated 1900° F. | M.O.R. (KPSI) 500° F. 6 Days High Humidity | M.O.R. (KPSI) 500° F. 60 Days High Humidity |
| 1 | 2650 | 24 | 121 | — | 40 | — | — | — |
| 2 | 2650 | 24 | 129 | — | 13* | — | — | — |
| 3 | 2650 | ½ | 123 | 105 | 102 | 105 | 109 | 125 |
| 4 | 2650 | 1 | 126 | 108 | 103 | 115 | 121 | 95 |
| 5 | 2650 | 2 | 131 | 114 | 109 | 115 | 121 | 115 |
| 6 | 2550 | 1 | 110 | 93 | 95 | 118 | 128 | 127 |
| 7 | 2550 | 2 | 124 | 105 | 111 | 125 | 117 | 122 |
| 8 | 2550 | 4 | 115 | 102 | 99 | 120 | 116 | 131 |

We claim:

1. A method of imparting aging resistance to an article fabricated of a mixture of zirconium oxide and yttrium oxide of at least one mol percent but less than 7.3 mol percent of the mixture, comprising:
   (a) sintering said article at a temperature and for a period of time of less than 10 hours to produce a densified partially stabilized zirconia product having essentially no monoclinic crystal phase when cooled to room temperature;
   (b) subjecting the sintered article to an operation that results in the formation of monoclinic crystal phase at the surface of the article; and
   (c) heat treating said article to a temperature range below sintering of step (a) and within the range of 1800°–1950° F. (982°–1065° C.) for 4–30 hours to substantially transform all monoclinic crystal structure to tetragonal crystal and/or remove substantially all seeds for monoclinic phase growth.

2. The method as in claim 1, in which the operation of step (b) is machining.

3. The method as in claim 1, in which step (b) may additionally permit the existence of seeds for monoclinic crystal growth.

4. The method as in claim 1, in which said step (a) is carried out in the temperature range of 2550°–2650° F. (1399°–1454° C.) and for a period of time of 0.5–4 hours.

5. The method as in claim 1, in which said steps (a) and (c) are carried out in air.

6. The method of claim 1, in which the operation of step (b) is cracking of the article surface.

7. The method as in claim 1, in which the article is fabricated from a powder mix having an average particle size of about 250 angstroms.

8. The method as in claim 1, in which said article is by compacting a reactive powder of said zirconium oxide an yttrium compound, said compaction being carried out at a pressure in the range of about 105–315 MPa.

9. A sintered, machined, and heat treated article comprised of zirconium oxide and 1–7.3 mol percent yttrium oxide, said article being comprised of a substantially tetragonal crystalline structure with surface zones of re-transformed monoclinic to tetragonal crystals resulting from post-sintering heat treatment at 1800°–1950° F. for 4–30 hours.

10. The article in claim 9, in which the crystal structure has an average particle size of 0.5–2 microns.

11. A method of imparting aging resistance to an article fabricated of a mixture of zirconium oxide and yttrium oxide of at least one mol percent and less than 7.3 mol percent of the mixture, comprising:
   (a) sintering said fabricated article at temperature of about 2550°–2650° F. (1399°–1454° C.) and for a period of time of less than 10 hours to produce a sintered transformation-toughened yttria partially stabilized densified product having little or no monoclinic crystal phase when cooled to room temperature;
   (b) heat treating said product to the temperature range of 1800°–1950° F. (982°–1065° C.) for 4–30 hours to remove substantially all seeds for monoclinic phase growth and/or transform substantially all monoclinic crystal structure to tetragonal crystal; and
   (c) following step (a) and prior to or subsequent to step (b), subjecting the product to a machining operation or cracking that would be capable of stimulating monoclinic crystal growth.

12. A method of imparting aging resistance to an article fabricated of a mixture of zirconium oxide and yttrium oxide present in an amount of at least one mol percent and less than 7.3 mol percent of the mixture, comprising:

(a) sintering said fabricated article at a temperature in the range of 2550°–2650° F. (1399°–1454° C.) and for a period of time of about 0.5–4 hours to produce a densified product having substantially no monoclinic crystal phase when cooled to room temperature;
(b) heating said product to substantially the temperature range of 1800°–1950° F. (982°–1065° C.) for about 4–30 hours to substantially transform all monoclinic crystal structure to tetragonal crystal and/or remove substantially all seeds for monoclinic phase growth; and
(c) following step (a) and prior to or subsequent to step (b), subjecting the product to a machining operation or cracking that would be capable of stimulating monoclinic crystal growth.

* * * * *